April 18, 1967 H. WEISS 3,315,142

MAGNETIC-FIELD DEPENDENCE SIGNAL TRANSMITTER OR SIGNALLER

Filed Dec. 19, 1963

3,315,142
MAGNETIC-FIELD DEPENDENCE SIGNAL TRANSMITTER OR SIGNALLER

Herbert Weiss, Nurnberg, Germany, assignor to Siemens-Schuckertwerke Aktiengesellschaft, Berlin-Siemensstadt and Erlangen, Germany, a corporation of Germany Filed Dec. 19, 1963, Ser. No. 331,870
Claims priority, application Germany, Jan. 30, 1963, S 83,489
2 Claims. (Cl. 321—2)

My invention relates to high-speed switches, particularly of the magnetic-field dependent type.

Advances in automation have made increasing demands upon high-speed switches, such as for precision control of automatic machine tools, rolling mills, etc. These switches must not only respond in progressively shorter times and to smaller control signals, but must also produce larger and more accurate information signals for other regulating apparatus. Such characteristics are beyond the ability of mechanical switching elements whose switching delays are generally so great as to impair the speed of the semiconductor control system, or other system, of which they may be a part.

An object of this invention is to provide an improved high-speed switching apparatus.

Another object of this invention is to provide an improved high-speed switching apparatus responding to a magnetic field.

According to a feature of my invention, a switching device comprises an oscillator circuit having a tank circuit, a transistor, and a connecting feedback circuit from the tank circuit to the transistor. The feedback circuit possesses a magnetoresistive member (magnetic-field dependent resistor) which controls the feedback so as to produce oscillations in response to a magnetic input signal.

Such magnetoresistive members are semiconductor devices in which, by virtue of design and geometric features, the occurrence of the Hall effect is suppressed or fully eliminated, with the result that the ohmic resistance of the device increases greatly in response to a magnetic field acting upon the device. Galvanomagnetic resistors are known from U.S. Patent No. 2,894,234 of H. Weiss and H. Welker, assigned to the assignee of the present invention. The preferred resistance materials for such resistors are indium arsenide and indium antimonide, especially the latter material which is used in the devices available from the assignee in the form of elongated prismatic bodies having terminals at their respective ends, as well as in the form of circular discs having one terminal in the center and the other terminal along the periphery (field disc), both types of galvanomagnetic resistors being more fully described in the above-mentioned patent.

The combination of a magnetic-field dependent resistor with an oscillator feedback circuit provides a circuit which, because of the oscillator frequency, can be rapidly switched in and out, at approximately $10^{-4}$ second at 30 kilocycles, and which can be energized contactlessly by means of an iron core, a magnet, or a small current or voltage change.

Other features of the invention will be pointed out in the claims forming a part of this specification. Other objects and advantages of the invention will become obvious from the following detailed description when read in light of the accompanying drawing. However, it will be noted that the invention may be embodied, within the scope of the invention, other than specifically disclosed herein. In the drawing:

Figure 1:
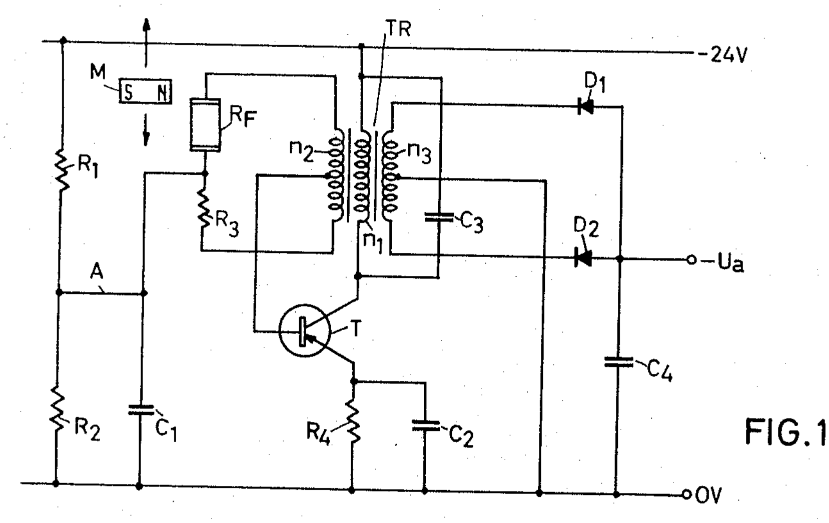
FIG. 1 is a schematic diagram of a circuit embodying features of the invention.

In FIG. 1, a series arrangement comprising the primary winding $n_1$ of transformer TR, the emitter-collector circuit of a transistor T, and a resistor $R_4$ connects across the terminals 0 v. and —24 v. of a direct voltage source. The emitter biasing resistor $R_4$ has a parallel A.C. by-pass capacitor $C_2$. Forming a tank circuit with the primary winding $n_1$ of transformer TR is a parallel oscillating circuit capacitor $C_3$. The transformer TR in addition possesses an output winding $n_3$ and a feedback winding $n_2$ having a centertap connected directly with the base of transistor T. The ends of the winding $n_2$ connect respectively through a resistor $R_3$ and through a magnetic-field dependent resistor $R_F$ to a lead A. The resistor $R_F$ is of the previously mentioned magnetoresistive or galvanomagnetic type disclosed in U.S. Patent No. 2,894,234. A magnet M adjacent the resistor $R_F$ moves in the direction of the arrow and possesses a magnetic field influencing the resistor $R_F$.

The lead A constitutes the midtap of a voltage divider which connects across the source terminals 0 v. and —24 v. and comprises two resistors $R_1$ and $R_2$. The resistor $R_2$, connected to the same terminal 0 v. as the resistor $R_4$, likewise has connected thereacross an A.C. by-pass capacitor $C_1$.

The output winding $n_3$ of the transformer TR connects through two rectifying diodes $D_1$ and $D_2$ to an output terminal $U_a$ and a midtap thereof connects to the output terminal 0 v. so as to form a full-wave rectified output at these terminals. A smoothing capacitor $C_4$ across the output terminals filters the full-wave rectified output which may be applied across a load having a resistance $R_a$. The potential of the lead A is determined by choice of resistors $R_1$ and $R_2$ so as to produce a given emitter base current, and hence to establish a given emitter-collector current in transistor T and a corresponding voltage drop across the resistor $R_4$.

The primary winding $n_1$ of transformer TR and the capacitor $C_3$ form a tank circuit having a relatively high resonance frequency, for example 30 kc., and tune the oscillator circuitry of which transistor T is a part. Capacitor $C_3$ may be an actual capacitor or may constitute the stray capacitance of the windings in transformer TR. In this oscillator, a voltage is first formed across winding $n_2$. This then forms an A.C. feedback voltage $v_k$ between the tap of the feedback winding $n_2$ and the junction of resistors $R_1$ and $R_2$, and hence between the constant voltage lead A and the base of the transistor T. Whether the feedback voltage $v_k$ provides positive, negative or zero feedback depends upon the relative values of $R_3$ and $R_F$. For example if $R_3=R_F$, $v_k=0$. Resistor $R_3$ is chosen to produce, between the tap on transformer winding $n_2$ and the junction of resistors $R_3$ and $R_F$, a feedback voltage $v_k$ equal to zero or of a phase angle producing a negative feedback, when $R_F$ is unmagnetized.

If the magnetic-field dependent resistor $R_F$ is subjected to a magnetic field with increasing induction B, its resistance value increases. If $R_3=R_F$ (unmagnetized), the feedback voltage $v_k$ starts at zero and, with increasing values of resistor $R_F$, grows to produce positive feedback. If $R_3>R_F$ (unmagnetized), as $R_F$ increases in response to increased induction B, the feedback voltage $v_k$ starts as a negative feedback whose phase angle is then reversed 180°, i.e. the polarity of the voltage $v_k$ is reversed through zero, and the negative feedback is changed to a positive feedback. This energizes the oscillator circuit. The output winding $n_3$ of the transformer exhibits a voltage which is recitified by diodes $D_1$ and $D_2$ and produces an output signal at the output terminals.

The following are sample values for the components of FIG. 1:

$R_F$ is an InSb plate as disclosed in U.S. Patent No. 2,894,234 having a basic resistance when not subjected to a magnetic field of approximately 100 ohms.

$R_1=R_2=10$ kilohms
$R_3=110$ ohms
$R_4=2.4$ kilohms
$C_1=50$ nf.
$C_2=5$ $\mu$f.
$C_3=0$ (the stray capacitance of TR)
$C_4=3.3$ nf.
T is a transistor, Siemens type TF 65/30 or AC 151
$D_1$, $D_2$ are germanium diodes, Siemens type RL 44G TR is a transformer with a laminated silicon-ferrite core such as Ser. No. 57 T5/T5 with a core outer diameter of 23 mm., a core size of 2 x 8.5 mm., Siemens designation of the material 1100 N 22.

Inductivity of a winding $A_L=400$ nH/Wdg$^2$.

$n_1=150$ turns of 0.2 mm. copper-lacquered wire
$n_2=2\times12$ turns of 0.2 mm. copper-lacquered wire
$n_3=2\times320$ turns of 0.1 mm. copper-lacquered wire.

Figure 2:
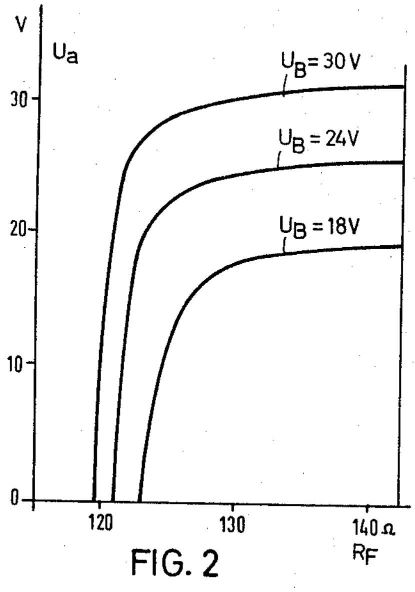
FIG. 2 is a graph illustrating the change in output voltage which occurs as a result of changes in the field-plate resistance at various energizing voltages.

These values produce ouput voltages depending upon the field plate resistance at various feed voltages corresponding to the curves illustrated in FIG. 2. Various load resistances $R_a$ at the output terminals produce the curves shown in FIG. 3.

FIG. 2 illustrates the output voltages $U_a$ (in the ordinate) as a function of the field plate resistance $R_F$ (along the abscissa) for various operating potentials $U_B$. The output voltage $U_a$ is across a load $R_a$ of 30 kilohms. An enlargement of the filed plate resistance $R_F$ about 3 ohms, corresponding to 2.5%, permits the output voltage to grow from 0 to 90% of the operating voltage $U_B$. If the field plate resistance $R_F$ grows even more, the value output voltage $U_a$ only rises slightly more.

Figure 3:
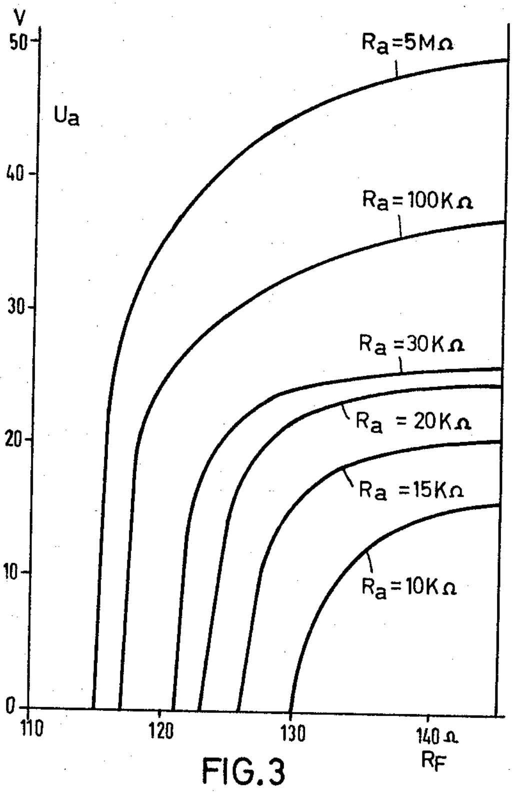
FIG. 3 is a graph illustrating the changes in output voltage for changes in the magnetically dependent field-plate resistance at various load resistances from 10 kilohms to 5 megohms at an energizing voltage of 24 volts.

FIG. 3 illustrates the output voltage $U_a$ (in the ordinate) as a function of the field plate resistance $R_F$ (along the abscissa) for various load resistances $R_a$. The operating voltage $U_B$ here is a constant 24 volts. At smaller load resistances ($R_a$) than 30 kilohms, the output voltage $U_a$ as well as the sensitivity drops.

As is obvious from FIGS. 2 and 3, the circuit arrangement is such that even at very small resistance changes of the magnetic field dependent resistor $R_F$, the transistor T is positively energized, so that the output voltage reaches its maximum after a short time determined by the high oscillating frequency.

In FIG. 1, the magnet M may be replaced by a stationary coil responsive to a voltage, which triggers the oscillator when it exceeds a threshold value. Moreover, the resistor $R_F$ can have a value less than 100 ohms. If, for example, it has a value of 90 ohms, oscillations will not occur until the magnet M comes closer to $R_F$ so that the magnetic flux passing through $R_F$ raises its value above the value of $R_3$. Alternately, the threshold value of voltages applied to the above-mentioned stationary coil will be slightly higher to initiate oscillations.

Figure 4:
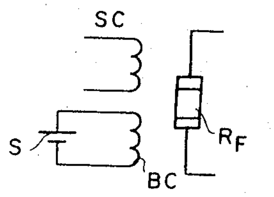
FIG. 4 shows another means for energizing and biasing the field plate in FIG. 1.

The threshold level of flux to which the resistor $R_F$ responds can be established by a biasing coil as shown in FIG. 4. Here the coil SC is the aforementioned stationary coil and the coil BC is the biasing coil connected across a constant source S. The coil BC may be substituted by a permanent magnet.

Variation of the flux bias on resistor $R_F$ varies not only the threshold level to which $R_F$ responds but also, due to the curvature of the flux-resistance characteristic of $R_F$, the sensitivity of $R_F$ to flux changes.

I claim:

1. A magnetically responsive signal transmitter, comprising a signal-voltage generating tank circuit having an iron-cored inductance member, a transistor having an emitter-collector load circuit and a base control circuit, said tank circuit being series-connected in the load circuit of said transistor, a magnetic-field responsive resistance member, the base control circuit of said transistor being feedback-coupled through said resistance member with said tank circuit, an inductance winding inductively linked with said inductance member, output signal lead, and rectifier means connecting said inductance winding with said output signal leads.

2. A magnetically responsive signal transmitter, comprising a signal-voltage generating tank circuit, a transistor having an emitter-collector load circuit and a base control circuit, said tank circuit being series-connected in the load circuit of said transistor, a feedback winding inductively interlinked with said tank circuit, a resistor, a magnetic-field responsive resistance member and said resistor being connected in series with each other across said feedback winding, base biasing means connected in common with said resistor and said resistance member, and output means coupled to said tank circuit and including rectifier means.

References Cited by the Examiner

UNITED STATES PATENTS

| | | | |
|---|---|---|---|
| 2,894,234 | 7/1959 | Weiss et al. | 338—32 |
| 3,021,514 | 2/1962 | Regis et al. | 331—112 X |
| 3,034,023 | 5/1962 | Stratton | 331—112 X |

JOHN F. COUCH, *Primary Examiner.*

W. H. BEHA, *Assistant Examiner.*